US008282213B2

(12) United States Patent
Chapman

(10) Patent No.: US 8,282,213 B2
(45) Date of Patent: Oct. 9, 2012

(54) STEERING HANDLE ADAPTER FOR A CAMERA DOLLY

(75) Inventor: Leonard T. Chapman, North Hollywood, CA (US)

(73) Assignee: Chapman/Leonard Studio Equipment, Inc, North Hollywood, CA (US)

( * ) Notice: Subject to any disclaimer, the term of this patent is extended or adjusted under 35 U.S.C. 154(b) by 449 days.

(21) Appl. No.: 12/706,824

(22) Filed: Feb. 17, 2010

(65) Prior Publication Data

US 2011/0079105 A1 Apr. 7, 2011

Related U.S. Application Data

(60) Provisional application No. 61/247,804, filed on Oct. 1, 2009.

(51) Int. Cl.
*B62B 5/06* (2006.01)
*G03B 17/00* (2006.01)
(52) U.S. Cl. ..................... 352/243; 280/47.11
(58) Field of Classification Search .................. 352/243; 280/47.11, 98, 99, 103
See application file for complete search history.

(56) References Cited

U.S. PATENT DOCUMENTS

| | | | |
|---|---|---|---|
| 2,995,380 A | | 8/1961 | King |
| 6,135,465 A | * | 10/2000 | Chapman ................. 280/47.11 |
| 6,450,706 B1 | * | 9/2002 | Chapman ..................... 396/428 |
| 6,520,642 B1 | * | 2/2003 | Chapman ...................... 352/243 |
| 6,719,307 B1 | * | 4/2004 | Chapman ................... 280/47.34 |
| 7,037,006 B2 | * | 5/2006 | Chapman ..................... 396/428 |

FOREIGN PATENT DOCUMENTS

| | | |
|---|---|---|
| DE | 102009011228 A1 | 9/2010 |
| FR | 2568840 A1 | 2/1986 |
| GB | 1155469 A | 6/1969 |

OTHER PUBLICATIONS

Intellectual Property Office of UK, Search Report for GB Application No. 1016539.7, dated Jan. 26, 2011.

* cited by examiner

*Primary Examiner* — William C Dowling
(74) *Attorney, Agent, or Firm* — Kenneth H. Ohriner; Perkins Coie LLP

(57) ABSTRACT

An adapter for a steering handle of a camera dolly includes a first part and a second part attached to the first part in a way that allows for angular adjustment between them. This allows the steering handle to be aligned or squared up relative to the dolly chassis. The first part may be an adapter base and the second part may be a riser. The adapter base may have a flange with slotted holes alignable with holes in the riser. Fasteners, such as cap screws, extending through the slots and holes, may be loosened to allow angular movement between the adapter base and the riser. Once properly aligned, the fasteners are tightened. Grooves, openings, pins, or similar engagement features may be provided at the top end of the adapter base, to allow a steering handle to attach to, and to rotate with, the adapter base. A bore may extend through the adapter base and the riser, with a fitting on the riser adapted to engage with a steering system in the camera dolly. When installed on a camera dolly, the adapter allows the steering handle to align as desired. The adapter also raises the steering handle up, to allow for ergonomic use by a taller dolly operator.

21 Claims, 6 Drawing Sheets

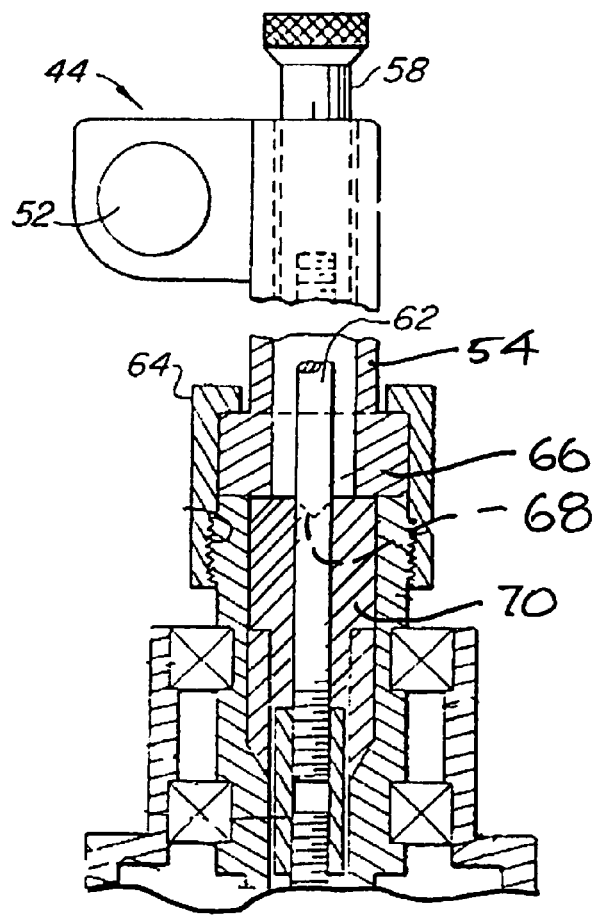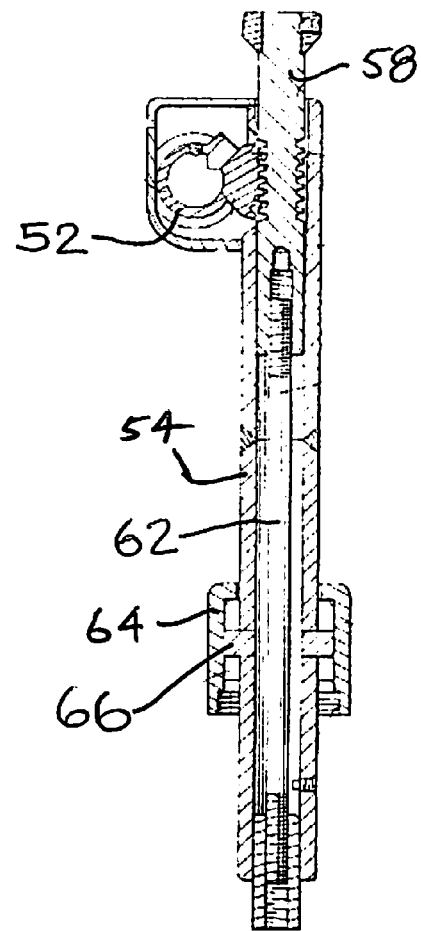
FIG. 4A
PRIOR ART
FIG. 4B
PRIOR ART

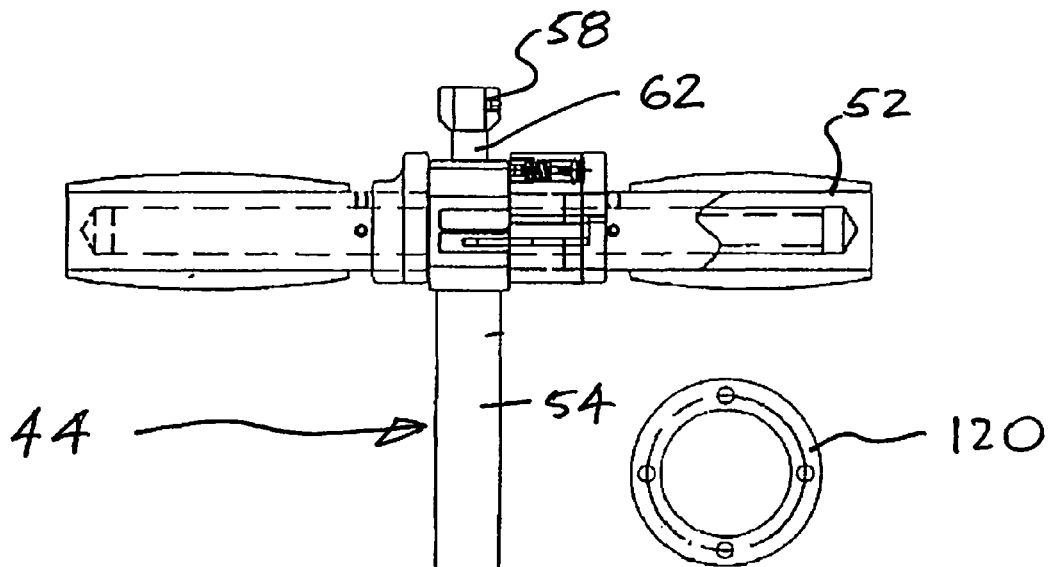
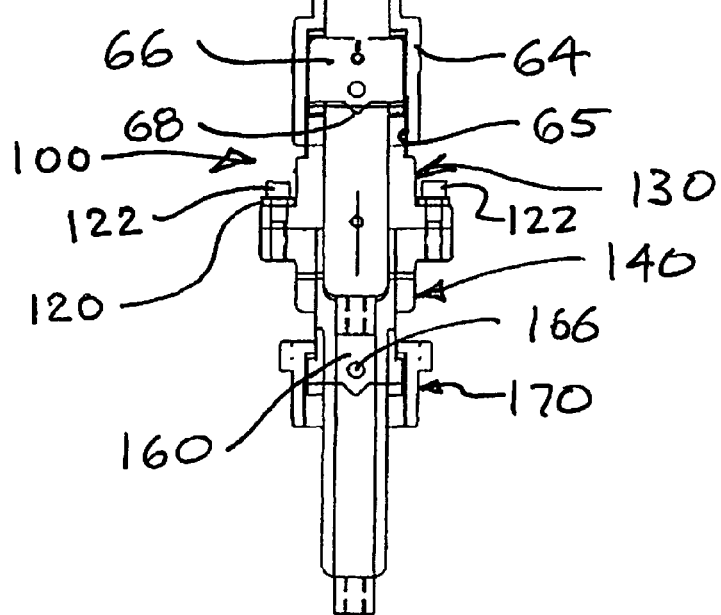
FIG. 6
FIG. 5

FIG. 13
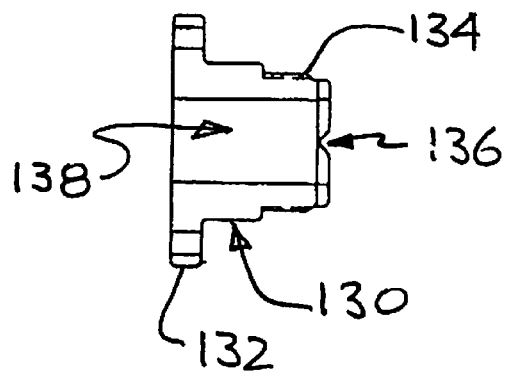
FIG. 14
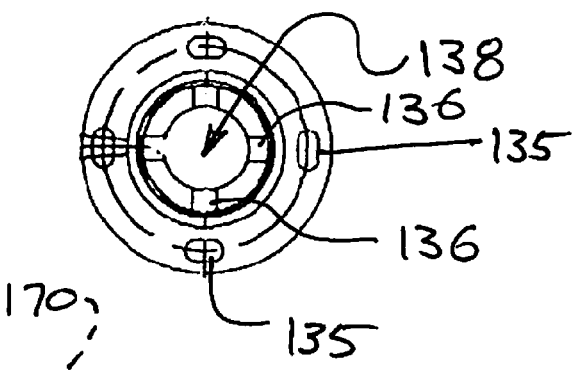
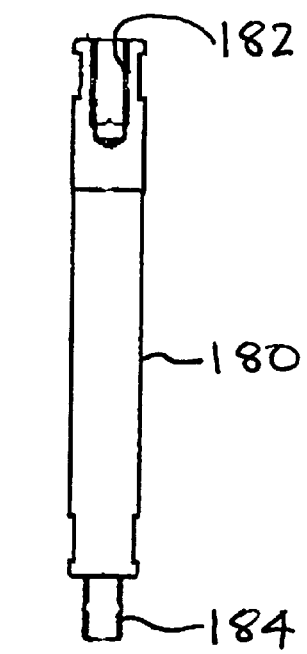
FIG. 15
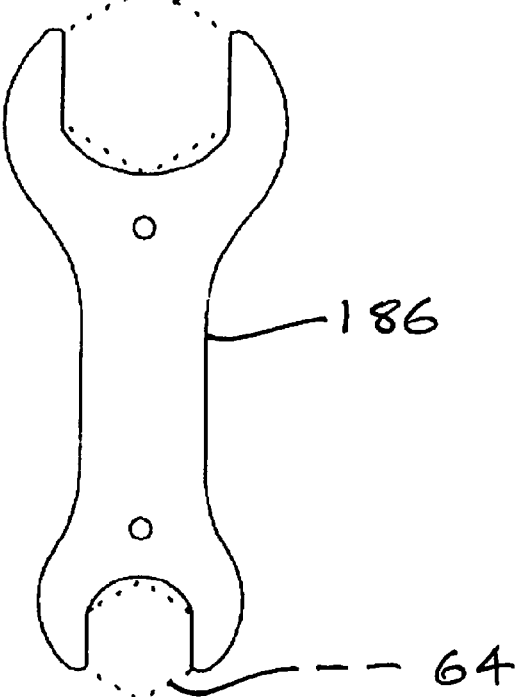
FIG. 16

STEERING HANDLE ADAPTER FOR A CAMERA DOLLY

PRIORITY CLAIM

This application claims priority to U.S. Provisional Patent Application No. 61/247,804, filed Oct. 1, 2009, and incorporated herein by reference.

BACKGROUND OF THE INVENTION

The field of the invention is camera dollies and camera pedestals.

In the production of motion pictures, the motion picture camera must often be moved from one position to another. The camera movements may require a change in camera position, camera angle, or camera elevation. The camera movement must be performed smoothly, as even small amounts of vibration of the camera can result in unsatisfactory filming, due to shaky or erratic recorded images. For certain film sequences, the camera must be held in a fixed position. In other film sequences, the camera must be continuously and rapidly moved to follow an action or moving sequence. Similar requirements must often be met when using television cameras.

Camera dollies and pedestals have long been used to support and move motion picture cameras. Typically, a camera dolly has four wheels or pairs of wheels on a chassis having a generally rectangular wheel base. The wheels may be attached to the chassis via articulated legs, or the wheels may be directly pivotably attached to the chassis.

Typically, the camera dolly has a steering system which steers the wheels of the dolly. A steering handle at the back end of the dolly is turned by the dolly operator to steer the dolly wheels. Newer camera dollies allow for shifting between corrective, crab and round steering modes by turning the steering handle. This design allows the dolly operator to shift between modes with both hands on the handle, while also simultaneously pushing and steering the dolly. However, due to the steering system design, shifting between steering modes can only occur when the steering system is at a zero degree position. In the zero degree position, the steering handle is nominally perpendicular to the longitudinal axis of the dolly.

Ordinarily, the steering handle remains aligned with the steering system. However, certain adverse events, such as collisions, shipping damage, etc. can cause the steering handle to become misaligned with the steering system. As a result, shifting between steering modes can only then occur with the steering handle displaced from the zero degree position. Accordingly, the operating feel of the dolly is degraded. Shifting between steering modes by dolly operator is also disrupted. Re-aligning the steering system requires that the dolly be returned to the factory or to a repair depot.

Accordingly, it is an object of the invention to provide an improved camera dolly that allows for quick and easy re-alignment of the steering handle with the steering system.

The camera dolly is typically pushed over the floor by one or more dolly operators. Even a smaller camera dolly may weigh 120 kg or more. In addition to the payload weight of the camera, the dolly may also be loaded with batteries, lens cases, and other accessories. Moreover, a camera operator, and an assistant may also ride on the dolly, increasing the total weight to over 250 kg. Consequently, the dolly operator(s) must often push the dolly with significant force. At the same time, the dolly operator generally must also continuously watch the path of the dolly movement, look for cues from the camera crew, target marked floor positions, etc. As a result, dolly operation can be difficult. Push bars and similar accessories are sometimes used to help the dolly operators maneuver the dolly. However, regardless of these accessories, the dolly operator steering the dolly generally must still push or pull forcefully on the steering handle while moving the dolly. The steering handle is at a fixed height of about 88 cm for use of an operator having a height of about 175 cm. However, taller dolly operators usually prefer to have a higher steering handle. Accordingly, it is also an object of the invention to provide a camera dolly where the steering handle height may be changed to the user's preference.

SUMMARY OF THE INVENTION

In one aspect of the invention, an adapter for a steering handle of a camera dolly includes a first part and a second part attached to the first part in a way that allows for angular adjustment between them. This allows the steering handle to be aligned or squared up relative to the dolly chassis.

In a second aspect, the first part may be an adapter base and the second part may be a riser. The adapter base may have a flange with slotted holes alignable with holes in the riser. Fasteners, such as cap screws, extending through the slots and holes, may be loosened to allow angular movement between the adapter base and the riser. Once properly aligned, the fasteners are tightened. Grooves, openings, pins, or similar engagement features may be provided at the top end of the adapter base, to allow a steering handle to attach to, and to rotate with, the adapter base. A bore may extend through the adapter base and the riser, with a fitting on the riser adapted to engage with a steering system in the camera dolly. When installed on a camera dolly, the adapter allows the steering handle to align as desired. The adapter also raises the steering handle up, to allow for ergonomic use by a taller dolly operator.

Other and further objects and advantages will become apparent from the following detailed description. This description and the accompanying drawings are provided as an example, and should not be taken as a limitation on the scope of the invention. The invention resides as well in the combination of a camera dolly and a steering handle adapter, and in methods of using a steering handle adapter with a camera dolly.

BRIEF DESCRIPTION OF THE DRAWINGS

In the drawings the same reference number indicates the same element in each of the views.

FIG. 4A is a section view of the steering handle engaged with a steering system of the camera dolly shown in FIG. 1.

FIG. 4B is a section view of the steering handle of FIG. 1 removed from the camera dolly for illustration.

FIG. 5 is front view in part section of the present steering handle adapter in use with dolly and steering handle shown in FIGS. 1-4.

FIG. 6 is a top view of the ring used with the steering handle adapter shown in FIG. 5.

FIG. 13 is section view of the adapter base shown in FIG. 5.

FIG. 14 is a top view of the adapter base shown in FIG. 13.

FIG. 15 is section view of the shift rod extension shown in FIG. 5.

FIG. 16 is a top view of wrench for use with the handle adapter shown in FIG. 5.

DETAILED DESCRIPTION OF THE DRAWINGS

Figure 1:
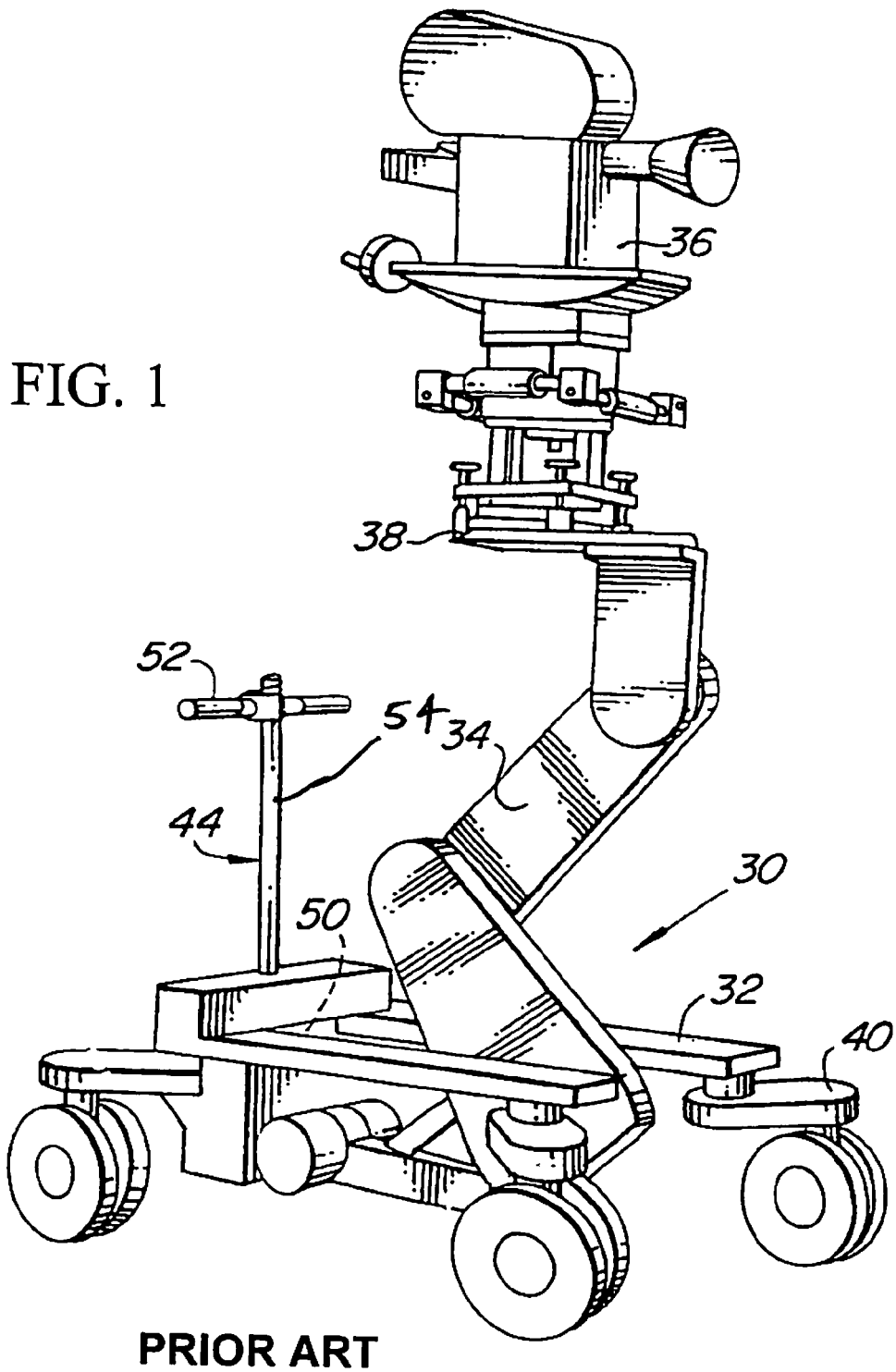
FIG. 1 is a perspective view of a prior art camera dolly.

Turning now to the drawings, as shown in FIGS. 1-4B, a prior art camera dolly 30 has a chassis 32 and an arm 34. A camera 36 may be supported on a camera platform 38 at the upper end of the arm 34. The chassis 32 may have articulated legs 40, with wheels 46 rotatably attached to a kingpin 48 on each of the legs 40.

The dolly 30 has a steering system 50 largely contained within the chassis 32. The steering system may provide corrective steering; crab steering, round steering, or any combination of these steering modes, including all three steering modes. The steering system is operated by a steering handle assembly 44. The steering handle assembly 44 includes a steering bar 52 that may allow for shifting between steering modes, by turning the steering bar about a horizontal axis. The steering bar may also allow for directional steering (changing the steering direction of the wheels 46) by turning the steering bar about a vertical axis.

Figures 2, 3:
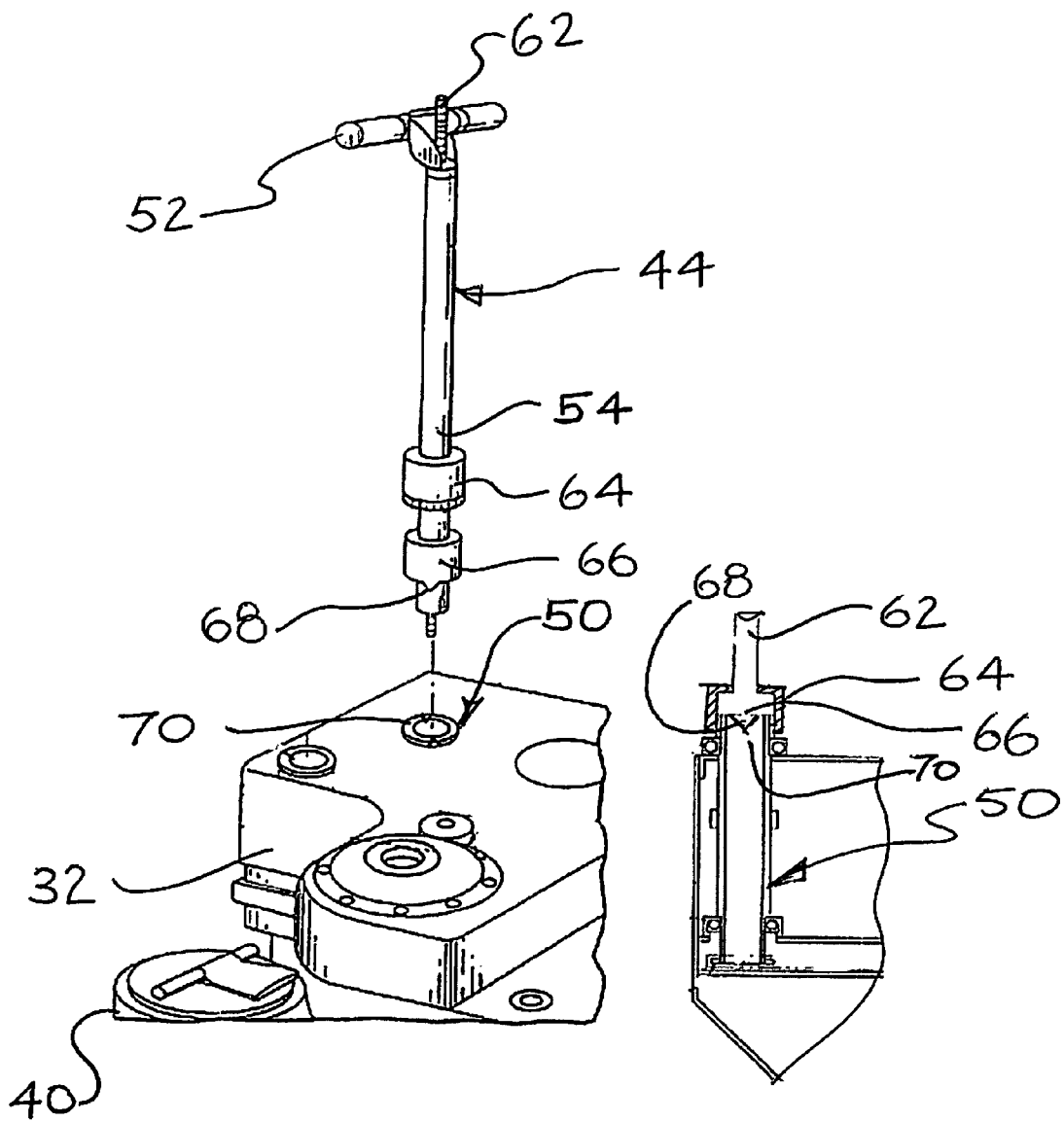
FIG. 2 is a perspective view of the steering handle of the camera dolly shown in FIG. 1.
FIG. 3 is a schematic section view of the steering handle shown in FIG. 2, with the handle removed from the dolly for illustration.

As shown in FIGS. 3, 4A and 4B, the steering handle assembly 44 includes a shift rod 62 that engages with the steering system 50. As it is turned about a horizontal axis, the steering bar 52 drives the shift rod 62 vertically, to shift between steering modes. The shift rod is captured at the top end of the steering handle assembly with a knob 58. The shift rod 62 is largely contained within a handle shaft 54. A tang collar 66 is attached to the handle shaft 54. Tangs 68, or similar features, engage with a drive fitting or receptacle 70 in the steering system 50, so that steering movement of the handle assembly 44 correspondingly actuates the steering system 50. A threaded collar 64 secures the handle assembly onto the fitting 70. An example of a dolly and steering system is provided in U.S. Pat. No. 6,520,642, incorporated herein by reference.

In the design as described above, the orientation of the steering bar is fixed relative to the drive fitting 70 of the steering system. If steering bar 52 moves out of alignment with the steering system, then when the wheels 46 are at the zero degree position (straight ahead), the steering bar 52 can be several degrees displaced from the zero degree position. This mis-alignment can make it difficult for an operator to steer the dolly 30, because the geometry is altered, and the operating feel of the dolly is disturbed. In addition, in many camera dollies, shifting between steering modes can only be achieved with the steering system in the zero degree position. If the steering bar 52 is mis-aligned with the steering system 50, the dolly operator may be able to easily determine when the steering system is in the zero degree position. As a result, the dolly operator may have difficulty in quickly and smoothly shifting between steering modes, especially when precise dolly maneuvering is required.

Referring now to FIGS. 5-14, the present steering handle adapter 100 overcomes any mis-alignment effects by allowing the steering bar 52 to be aligned with the steering system. As shown in FIGS. 5, 13 and 14, an adapter base 130 has a flange 132, a threaded neck 134, and a top surface having tang grooves 136 (or similar features) adapted to engage with the tangs 68 on the handle assembly 44. Slotted holes 135 extend through the flange 132, and can be aligned on a circle. A bore 138 extends entirely through the adapter base 130. The threaded neck 134 is designed to engage with internal threads on the collar clamp 64 on the handle assembly 44.

Figures 7, 8:
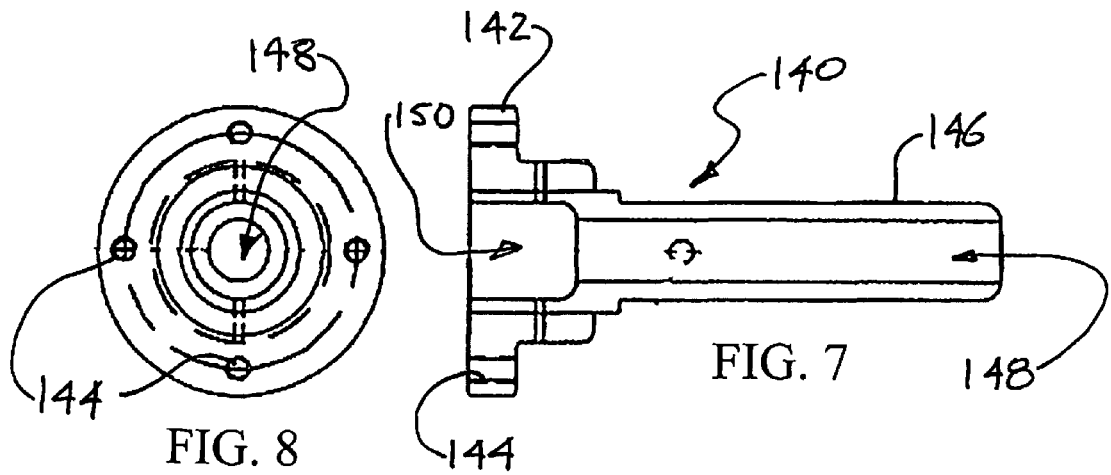
FIG. 7 is a side view of the adapter riser shown in FIG. 5.
FIG. 8 is a top view of the adapter riser shown in FIG. 7.

As shown in FIGS. 5, 7 and 8, the adapter 100 also includes a riser 140 having a through bore 148. The upper end of the riser 140 has threaded holes 144 that align with the slotted or elongate holes 135 in the adapter base. The holes 144 may be provided in a flange 142 on the riser 140. Alternatively, through holes may be used. The riser 140 also includes a shaft section 146. The flange 142 and the shaft section may be different materials. For example, the flange 142 may be aluminum while the shaft section 146 may be steel.

As shown in FIG. 5, a ring 120 is positioned on top of the flange 132 of the adapter base 130. Cap screws or bolts 122 pass through holes in the ring 120, through the slotted holes 135 in the adapter base 130, and engage into the threaded holes 144 in the riser 140. Alternatively, the cap screws 122 may engage with nuts below the flange 142 of the riser, and un-threaded clearance holes may be provided in the riser. Also as shown in FIG. 5, a recess or counter-bore 150 at the upper end of the riser 140 provides clearance for the lower end of the handle shaft 54.

Figures 9, 10:
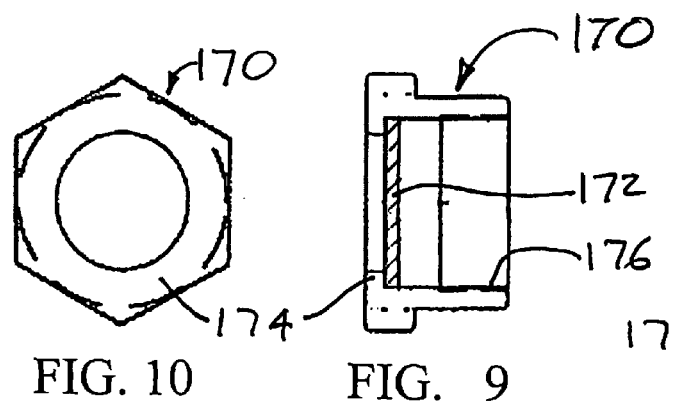
FIG. 9 is a section view of the collar nut shown in FIG. 5.
FIG. 10 is a top view of the collar nut shown in FIG. 9.
Figures 11, 12:
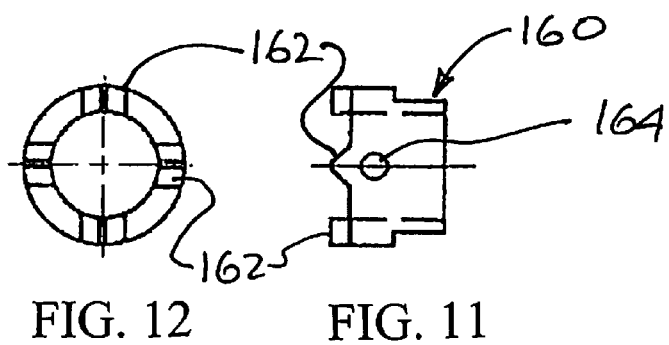
FIG. 11 is a side view of the riser tang collar shown in FIG. 5.
FIG. 12 is top view of the riser tang collar shown in FIG. 11.

Turning now to FIGS. 5, 11 and 12, a riser tang collar 160 has projections or tangs 162 designed to engage with the tang grooves or similar features in the drive fitting 70 of the steering system. The riser tang collar 160 is irrotatably attached to the shaft section 146 of the riser 140, for example via a pin 166. As shown in FIGS. 5, 9 and 10, a riser nut 170 is positioned on or around the shaft section 146, between the riser collar 160 and the flange 142 of the riser 140. The lower section of the riser nut 170 has internal threads that engage with the threads on the drive fitting 70 of the steering system 50. An inwardly extending radial flange 174 of the riser nut 170 overlies the riser collar 160. A bushing 172 within the flange 174 allows the riser nut 170 to be tightened without binding.

In use, the handle assembly 44 is temporarily removed from the dolly 30 by unscrewing the collar clamp 64 and the shift rod 62 from the drive fitting 70. The collar clamp may be unscrewed by hand, or using a wrench, depending on the specific designs used. The shift rod 62 is unscrewed via the knob 58. The adapter 100 is then installed onto the dolly 30. The shaft section of the riser 140 is inserted into the drive fitting 70, with the tangs 162 engaging into the grooves in the drive fitting 70. The riser nut 170 is then tightened onto the threads of the drive fitting 70. A wrench 186, as shown in FIG. 16, may be used for this purpose.

The upper end 182 of a shift rod extension section 180, as shown in FIG. 15, is threaded onto the lower end of the shift rod 62. The extension section 180 may include flatted sections to allow the extension section 180 to be turned with a wrench. The handle assembly 44 is then installed onto the adapter 100. The lower end of the handle shaft 54 is inserted through the bore 138 in the adapter base 130 and bottoms out in the counter-bore 150 at the upper end of the riser 140. The handle shaft is positioned so that the tangs 68 on the tang collar 66 engage into the tang grooves 136 on the top end of the adapter base 130. The collar clamp 64 is then tightened onto the threaded neck 134 of the adapter base 130. The shift rod is similarly tightened into place by turning the knob 58, to thread the lower end 184 of the shift rod extension 180 into the drive fitting 70. The dolly 30 can then be fully operated via the handle assembly 44 and the adapter 100.

To compensate for any mis-alignment between the handle bar 52 and the steering system, the cap screws 122 attaching the adapter base 130 to the riser 140 are temporarily loosened. This allows the handle bar 52 to be freely turned about the vertical axis, without actuating the drive fitting 70. After the handle bar 52 is properly aligned, the cap screws 122 are tightened. Generally, the handle bar 52 will properly align when it is precisely perpendicular to a longitudinal/front to back axis of the dolly chassis and the transmission is at the zero degree position. The cap screws and the slotted holes are a means for squaring up or for aligning the steering handle relative to the chassis. Other equivalent means for squaring up include clamp, screw thread devices, cams, and levers, all of which temporarily allow the steering handle to turn free of the steering system.

The adapter 100 raises the vertical position of the handle bar 52 up by the distance between the tang collar 66 and the riser collar 160. This dimension can be selected as desired when the adapter is manufactured. Typical dimensions used can provide for raising the handle bar 52 up by from about 6 to 30 cm. For taller dolly operators, this provides a more comfortable and ergonomic position of the handle bar 52.

Thus, a novel steering handle adapter for a camera dolly has been shown and described. Various changes and modifications may of course be made without departing from the spirit and scope of the invention. The invention, therefore, should not be limited, except by the following claims, and their equivalents.

The invention claimed is:

1. An adapter for a steering handle of a camera dolly, comprising:
   an adapter base having a top end and a bottom end;
   an adapter base torque fitting adjacent to the top end of the adapter base;
   an adapter flange adjacent to the bottom end of the adapter base;
   a riser having a riser flange and a shaft section, with the riser flange attached to the adapter flange;
   a riser torque fitting collar attached to the shaft section of the riser; and
   a riser nut on the shaft section of the riser between the riser torque collar and the riser flange.

2. The adapter of claim 1 with the riser flange attached to the adapter flange via a plurality of slotted through holes circumferentially aligned on the adapter flange aligned respectively with holes in the riser flange, and fasteners extending through the holes in the adapter flange and through the holes in the riser flange.

3. The adapter of claim 1 with the torque fitting comprising two or more tang grooves on the top end of the adapter base.

4. The adapter of claim 1 with a riser bore extending through the shaft section and the riser flange of the riser.

5. The adapter of claim 1 wherein the adapter base torque fitting and the riser torque fitting collar are complementary to each other.

6. The adapter of claim 1 further comprising a shift rod extension associated with the riser.

7. The adapter of claim 1 with the adapter base having a length L1 and the riser having a length L2, and further comprising a shift rod extension extending through the adapter base and the riser, with the shift rod extension having a length of about L1+L2.

8. The adapter of claim 6 with the shift rod extension having male threads at a first end and complementary female threads at a second end opposite from the first end.

9. An adapter for a steering handle of a camera dolly, comprising:
   an adapter base having a top end and a bottom end;
   an adapter base torque fitting adjacent to the top end of the adapter base;
   a riser having a shaft section;
   handle aligning means for irrotatably attaching the adapter base to the riser, and for temporarily releasing the adapter base to allow alignment of the steering handle;
   a riser torque fitting collar attached to the shaft section of the riser; and
   a riser nut on the shaft section of the riser.

10. The adapter of claim 9 with the handle aligning means including slotted holes in one or the adapter base and the riser and fasteners extending through the slotted holes.

11. An adapter for a steering handle of a camera dolly comprising:
    an adapter base having a top end and a bottom end, with an adapter bore extending through the adapter base from the top end to the bottom end;
    an adapter flange at the bottom end of the adapter base, with a plurality of slotted through holes circumferentially aligned on the flange of the adapter base;
    two or more tang grooves on the top end of the adapter base;
    a riser having a riser flange including openings alignable with the through holes in the adapter flange of the adapter base;
    and the riser having a shaft section attached to the riser flange, with a riser bore extending through the shaft section and through the riser flange;
    a plurality of fasteners attaching the adapter flange to the riser flange;
    a riser tang collar attached to the shaft section; and
    a riser nut on the shaft between the riser tang and the riser flange.

12. A camera dolly, comprising:
    a chassis;
    a steering system within the chassis;
    a steering handle having a first end fitting;
    a steering handle adapter having a first part and a second part attached to the first part and selectively releasable from the first part to allow the second part to rotate relative to the first part;
    a second end fitting on the first part, with the first end fitting of the steering handle engaged with the second end fitting on the first part of the steering handle adapter; and
    a third end fitting on the second part engaged with the steering system.

13. The camera dolly of claim 12 wherein the first end fitting has the same size and shape as the third end fitting.

14. The camera dolly of claim 12 wherein the second end fitting comprises a ring having two V-shaped grooves.

15. The camera dolly of claim 12 further comprising a nut on the second part engageable onto a stud on the chassis for holding the third end fitting into engagement with the steering system.

16. The camera dolly of claim 12 with one of the first and second parts having a plurality of circumferentially spaced apart slotted through-holes and fasteners extending through the through-holes and also through holes in the other of the first and second parts.

17. The camera dolly of claim 12 further comprising a shift rod extending through the handle and connected to a shift rod extension within the first and second parts, and with the shift rod extension connected to the steering system.

18. The camera dolly of claim 12 with:
the first part comprising an adapter base having an adapter flange with a plurality of slotted through holes circumferentially aligned on the flange of the adapter base;
the second part comprising a riser having a riser flange including openings alignable with the through holes in the adapter flange of the adapter base;
and the riser having a shaft section attached to the riser flange, and a plurality of fasteners attaching the adapter flange to the riser flange.

19. An adapter for a steering handle of a camera dolly, comprising:
a first part and a second part attached to the first part and selectively releasable from the first part to allow the second part to rotate relative to the first part;
a second end fitting on the first part, with the first end fitting of the steering handle engaged with the second end fitting on the first part of the steering handle adapter; and
a third end fitting on the second part engageable with a steering system of a camera dolly.

20. A method of using a camera dolly, comprising:
removing a steering handle from a steering system of the camera dolly;
attaching an adapter to the steering system of the camera dolly;
attaching a shift rod extension within the adapter to the steering system of the camera dolly;
attaching the steering handle to the adapter;
attaching a shift rod within the steering handle to the sift rod extension;
unlocking the adapter;
rotating a first part of the adapter relative to a second part of the adapter to square up the steering handle with dolly chassis; and
locking the adapter to prevent rotation of the first part of the adapter relative to the second part of the adapter.

21. The method of claim 20 further comprising unlocking the adapter by un-tightening fasteners clamping the first part to the second part.

* * * * *